United States Patent
Tsukamoto et al.

[11] Patent Number: 5,908,096
[45] Date of Patent: Jun. 1, 1999

[54] HYDRAULIC SERVO UNIT FOR VEHICULAR POWER TRANSMISSION SYSTEM

[75] Inventors: Kazumasa Tsukamoto; Masahiro Hayabuchi; Masaaki Nishida; Akitoshi Kato; Satoru Kasuya; Nobutada Sugiura, all of Anjo; Tatsuya Iida, Takefu, all of Japan

[73] Assignee: Aisin AW Co., Ltd., Anjo, Japan

[21] Appl. No.: 08/771,140

[22] Filed: Dec. 20, 1996

[30] Foreign Application Priority Data

May 21, 1996 [JP] Japan ................................. 8-148523

[51] Int. Cl.⁶ ........................................... F16D 25/08
[52] U.S. Cl. .......................... 192/85 CA; 192/70.28
[58] Field of Search .................. 192/85 CA, 70.28; 475/146, 116

[56] References Cited

U.S. PATENT DOCUMENTS

| | | | |
|---|---|---|---|
| 3,038,575 | 6/1962 | Hansen | 192/85 CA |
| 3,251,247 | 5/1966 | Lamburn. | |
| 3,684,069 | 8/1972 | Pray | 192/85 CA |
| 4,811,628 | 3/1989 | Winkam et al. | 192/85 CA X |
| 5,234,090 | 8/1993 | Haka. | |
| 5,735,376 | 4/1998 | Moroto et al. | 192/85 CA |

FOREIGN PATENT DOCUMENTS

| | | |
|---|---|---|
| 0 733 827 A2 | 9/1996 | European Pat. Off. . |
| 0 733 834 A2 | 9/1996 | European Pat. Off. . |
| A-7-119761 | 5/1995 | Japan. |

*Primary Examiner*—Rodney H. Bonck
*Attorney, Agent, or Firm*—Oliff & Berridge, PLC

[57] ABSTRACT

A hydraulic servo unit for a vehicular power transmission system having a helical gear, including a clutch for connecting predetermined rotary elements to each other and a hydraulic servo for applying the clutch, the hydraulic servo including a cylinder, a piston fitted in the cylinder, a push member abutting against the piston through a bearing for transmitting the push force of the piston to the clutch, and a return spring for the piston, one of the rotary elements including a reaction member opposed to the push member for transmitting the push force of the piston to a case, and the cylinder is a stationary cylinder formed in the case. Further, the return spring is arranged between the push member and the reaction member and is loaded to apply a load higher than the thrust force of the helical gear, as acting upon the reaction member.

1 Claim, 4 Drawing Sheets

|      | C-1 | C-2 | B-1 | B-2 | B-3 | B-R |
|------|-----|-----|-----|-----|-----|-----|
| P    |     |     |     |     |     |     |
| REV  | ○   |     |     |     |     | ○   |
| N    |     |     |     |     |     |     |
| 1ST  | ○   |     |     |     | ○   |     |
| 2ND  |     | ○   |     |     | ○   |     |
| 3RD  | ○   | ○   |     |     |     |     |
| 4TH  |     | ○   | ○   |     |     |     |
| 5TH  |     | ○   |     | ○   |     |     |

FIG.3

HYDRAULIC SERVO UNIT FOR VEHICULAR POWER TRANSMISSION SYSTEM

BACKGROUND OF THE INVENTION

1. Field of the Invention

The invention relates to a vehicular power transmission and, more particularly, to a hydraulic servo device for a clutch of the power transmission.

2. Description of the Related Art

In a vehicular power transmission system, a hydraulic servo for applying a clutch to connect rotary elements to each other is generally mounted in one of the rotary elements. The technology of the so-called "stationary cylinder type construction", in which the hydraulic servo is arranged in the case of the power transmission system, is disclosed in the prior art in Japanese Patent Laid-Open No. 119761/1995. When the stationary cylinder type construction is adopted, the push force of the hydraulic servo cannot be received, unlike the prior art hydraulic servo mounted in the rotary element, by a reaction member on the rotary element having the servo to constitute a closed loop of force in the rotary element thereby to establish an unbalance force. In this technique, therefore, there is adopted the construction in which the push force of the hydraulic servo is transmitted through the reaction member to the case.

In the vehicular power transmission system, generally speaking, a helical gear having a tooth trace inclined with respect to the axis, is used to smoothen the power transmission through the meshing portion of the gear. The helical gear establishes a thrust force at the time of transferring the power, but the acting direction of the thrust force changes with the running state of the vehicle. Specifically, the thrust force is inverted between the state in which the vehicle is driven by the power of the engine (to be called the driving time), i.e., when the throttle is ON, and the state in which the engine is driven by the wheels (to be called the coasting time) by the coasting of the vehicle, i.e., when the throttle is OFF. When this state change occurs, the controllability of the hydraulic servo is lowered for the following reasons when the construction is of the stationary cylinder type as in the prior art.

A predetermined gap is formed, between the individual members of the power transmission system, to allow for manufacturing error, thermal expansion or other similar factors. When the thrust force acts against the push force of the hydraulic servo, the reaction member moves by the gap so as to reduce the clearance in the application direction of the clutch thereby to reduce the ineffective stroke of the piston. When the thrust force acts in the same direction as that of the push force of the hydraulic servo, on the other hand, the clearance of the clutch is not reduced so that the ineffective stroke is elongated. Thus, when the oil pressure is supplied to the hydraulic servo so as to apply the clutch at the driving time and at the coasting time, the ineffective stroke time changes to lower the controllability.

SUMMARY OF THE INVENTION

It is, therefore, a first object of the invention to provide a hydraulic servo unit for a vehicular power transmission system using the stationary cylinder type hydraulic servo unit as can be freed from any drop in the controllability of the clutch, as might otherwise be caused by a thrust force to be generated by a helical gear.

Next, a second object of the invention is to prevent the hydraulic servo unit from being lowered in the controllability of the clutch while setting the load of a return spring for holding the clearance in the clutch applying direction at a low value.

In order to achieve the aforementioned first object, according to the invention, in a vehicular power transmission system having a helical gear, there is provided a hydraulic servo unit comprising a clutch for connecting predetermined rotary elements to each other; and a hydraulic servo for applying the clutch, wherein the hydraulic servo includes a cylinder; a piston fitted in the cylinder; a push member abutting against the piston through a bearing for transmitting the push force of the piston to the clutch; and a return spring for the piston, wherein one of the rotary elements includes a reaction member opposed to the push member for transmitting the push force of the piston to a case, and wherein the cylinder is a stationary cylinder formed in the case. The hydraulic servo unit is characterized in that the return spring is arranged between the push member and the reaction member and loaded to apply a load higher than the thrust force of the helical gear, as acting upon the reaction member.

In order to achieve the aforementioned second object, the helical tooth of the helical gear is twisted in such a direction that the thrust force to act upon the reaction member is, at a coasting time, in the opposite direction to the load by the return spring and, at a driving time, in the same direction as that of the load by the return spring.

In the invention thus structured, the return spring is arranged between the reaction member and the push member so that it acts to retain the clearance of the push member for the clutch. Moreover, the load by the return spring causes a load higher than the thrust force of the helical gear, as acting on the reaction member, to act on the reaction member and the push member. Irrespective of the change in the thrust force acting on the reaction member, therefore, the push member is pushed back at all times so that the clearance between the clutch and the push member of the hydraulic servo is kept constant at all times. As a result, the controllability of the clutch is not deteriorated.

Especially according to the structure to accomplish the second object, moreover, the thrust force is lower at the coasting time than at the driving time so that the spring load necessary for the return spring can be lowered by causing the thrust force to act against the push force at the coasting time. Moreover, the spring load of the return spring can be lowered to lower the oil pressure necessary for applying the clutch.

BRIEF DESCRIPTION OF THE DRAWINGS

The invention will be described with reference to the drawings, in which:

FIG. 3 is an operation table of the automatic transmission; and

DESCRIPTION OF THE PREFERRED EMBODIMENT

Figure 2:
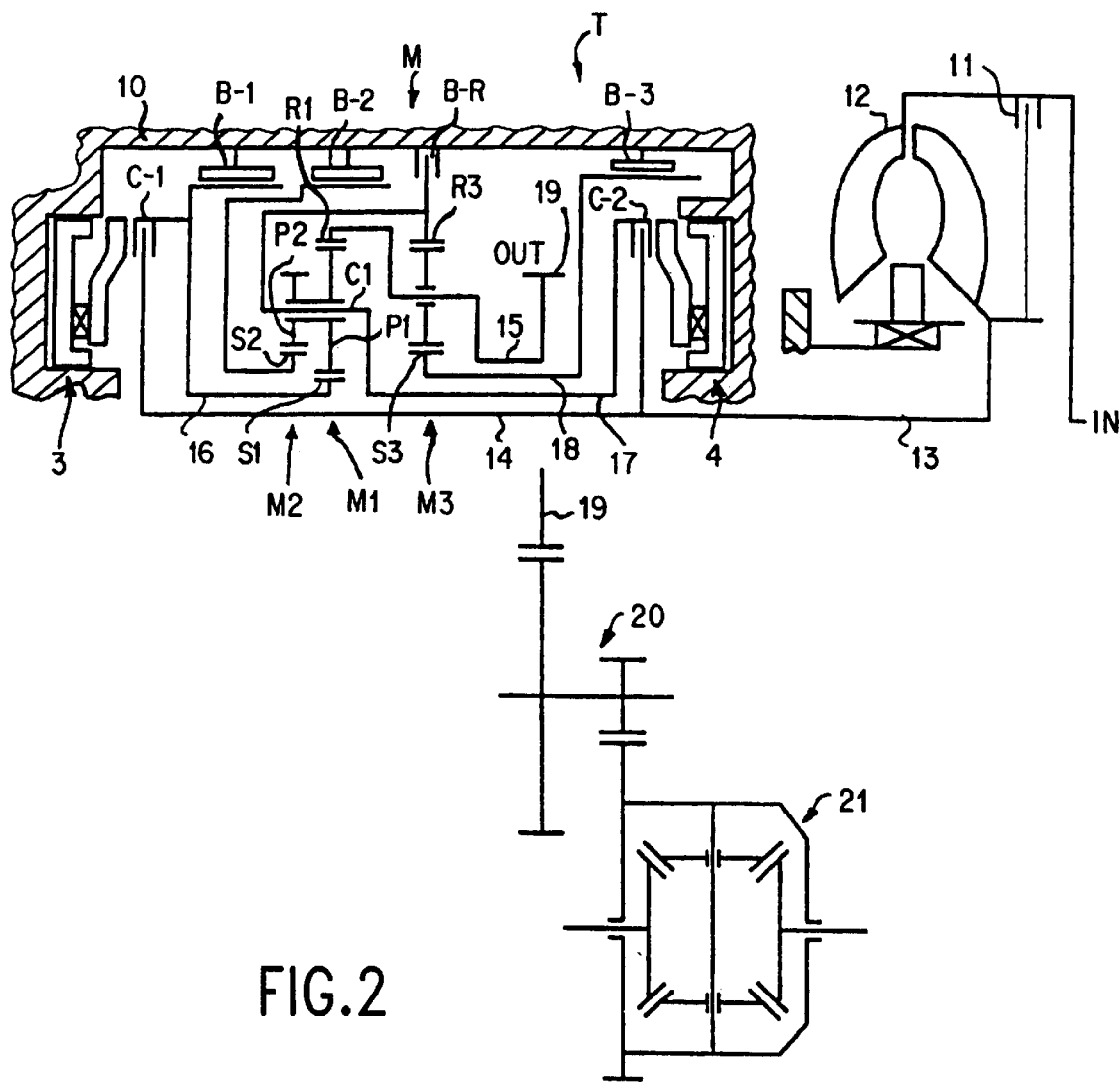
FIG. 2 is a schematic diagram showing the structure of a transfer system having the automatic transmission incorporated therein.

An embodiment of the invention will be described with reference to the accompanying drawings. FIG. 2 shows a power transmission system to which the invention is applied. The system is exemplified by a transfer system of transverse construction and is structured to include a torque converter 12 having a lockup clutch 11 connected to the engine of a vehicle; an automatic transmission T having a speed change mechanism M composed of three stages of planetary gear sets M1, M2 and M3 for shifting the output of the torque converter 12 into five forward and one reverse speeds; a counter gear 20 for decelerating the shifted output to transmit the decelerated output to a differential unit 21; and the differential unit 21 for transmitting the transmitted output to the right and left wheels of the vehicle.

In the speed change mechanism M, moreover, the pinion gears P1, P2 of larger and smaller diameters of the two gear sets M1, M2, respectively, are connected directly, and the individual ring gears R1, R3 and carriers C3, C1 of the two gear sets M1, M3, respectively, are connected to each other. The sun gear S1 and the carrier C1 of the gear set M1 are so connected through clutches (C-1, C-2), respectively, to an input shaft 14 leading to a turbine shaft 13 of the torque converter 12 that they may act as input elements. On the other hand, the ring gear R1 and the carrier C3, as connected to each other, are connected through an output shaft 15 to an output gear 19 acting as an output element. Moreover, the sun gear S1 of the gear set M1 can be fixed on a transmission case 10 by a brake B-1; the sun gear S2 of the gear set M2 can be fixed on the transmission case 10 by a brake B-2; the sun gear S3 of the gear set M3 can also be fixed on the transmission case 10 by a brake B-3; and the ring gear R3, as connected to the carrier C1, can be fixed on the transmission case 10 by a brake B-R.

In the embodiment, more specifically, the sun gear S1 is connected to the clutch C-1 through a sun gear shaft 16 fitted on the outer circumference of the input shaft 14; the carrier C1 is connected to the clutch C-2 through a carrier shaft 17 fitted on the outer circumference of the input shaft 14; and the sun gear S3 is connected to a brake B-3 through a sun gear shaft 18 fitted on the outer circumference of the carrier shaft 17. On the other hand, the individual brakes B-1, B-2, B-3, other than the brake B-R, have a band brake structure, and the brake B-R is a multiple disc brake structure, although the brakes are not limited thereto. Further, the output gear 19 is connected to the differential unit 21 through the counter gear 20 acting as a reduction gear.

Figure 3:
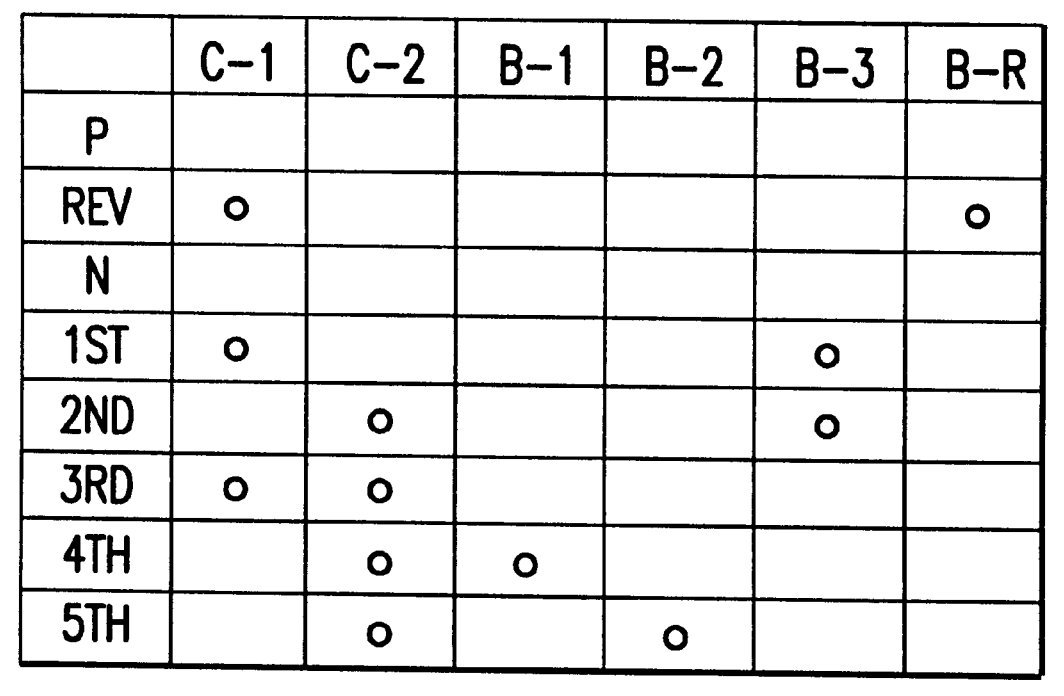

The automatic transmission T thus structured establishes the individual gear stages by feeding the oil pressure to hydraulic servos corresponding to the individual clutches and brakes, under the control of a hydraulic control unit (not-shown), to apply (as indicated by symbol ◯) and release (as indicated by blanks) the individual clutches and brakes, as shown in FIG. 3. Specifically, the first speed ($1^{ST}$) range is established when the clutch C-1 and the brake B-3 are applied. At this time, the rotation of the input shaft 14 enters the sun gear S1 through the clutch C-1 so that the rotation of the carrier C3 decelerated the most by the fixture of the sun gear S3, as effected by the application of the brake B-3, is output to the output gear 19. On the other hand, the second speed ($2^{ND}$) range is established by the applications of the clutch C-2 and the brake B-3. At this time, the input, as having entered the carrier shaft 17 through the clutch C-2, enters, as it is, the ring gear R3 through the carrier C1 so that the differential rotation of the carrier C3, as employing the sun gear S3 fixed by the application of the brake B-3 as a reaction element, is output to the output gear 19. The third speed ($3^{RD}$) range is established by the direct connection of the first planetary gear set M1, as effected by the applications of the two clutches C-1, C-2. At this time, the rotation of the input shaft 14 is output, as it is as the rotation of the carrier C3, to the output gear 19.

The fourth speed ($4^{TH}$) range, designated as the start of overdrive, is established by the application of the clutch C-2 and by the application of the brake B-1 for fixing the sun gear S1. At this time, the rotation of the input shaft 14 is transmitted, as the rotation of the ring gear R1 accelerated by the revolution of the pinion gear P1 from the rotation of the carrier C1, from the carrier C3 to the output gear 19. On the other hand, the fifth speed ($5^{TH}$) range is established by the applications of the clutch C-2 and the brake B-2. At this time, the rotation of the input shaft 14 is transmitted, as the rotation of the ring gear R1 more accelerated by the revolution of the smaller-diameter pinion gear P2 exerting a reaction upon the larger-diameter sun gear S2 from the rotation of the carrier C1 than that at the time of establishing the fourth speed ($4^{TH}$) range, from the carrier C3 to the output gear 19.

The reverse (REV) range is established by the applications of the clutch C-1 and the brake B-R. At this time, the rotation of the ring gear R1, as reversed and decelerated from the input of the sun gear S1 by the fixture of the carrier C1, is output from the output gear 19 through the carrier C3.

In the automatic transmission thus structured, the invention is embodied by exemplifying a helical gear by the planetary gear set M3, i.e., its ring gear R3, a predetermined rotary element by the input shaft 14 and the sun gear shaft 16 connected to the sun gear S1, a clutch by the clutch C-1, and a hydraulic servo by a hydraulic servo 3.

Figure 1:
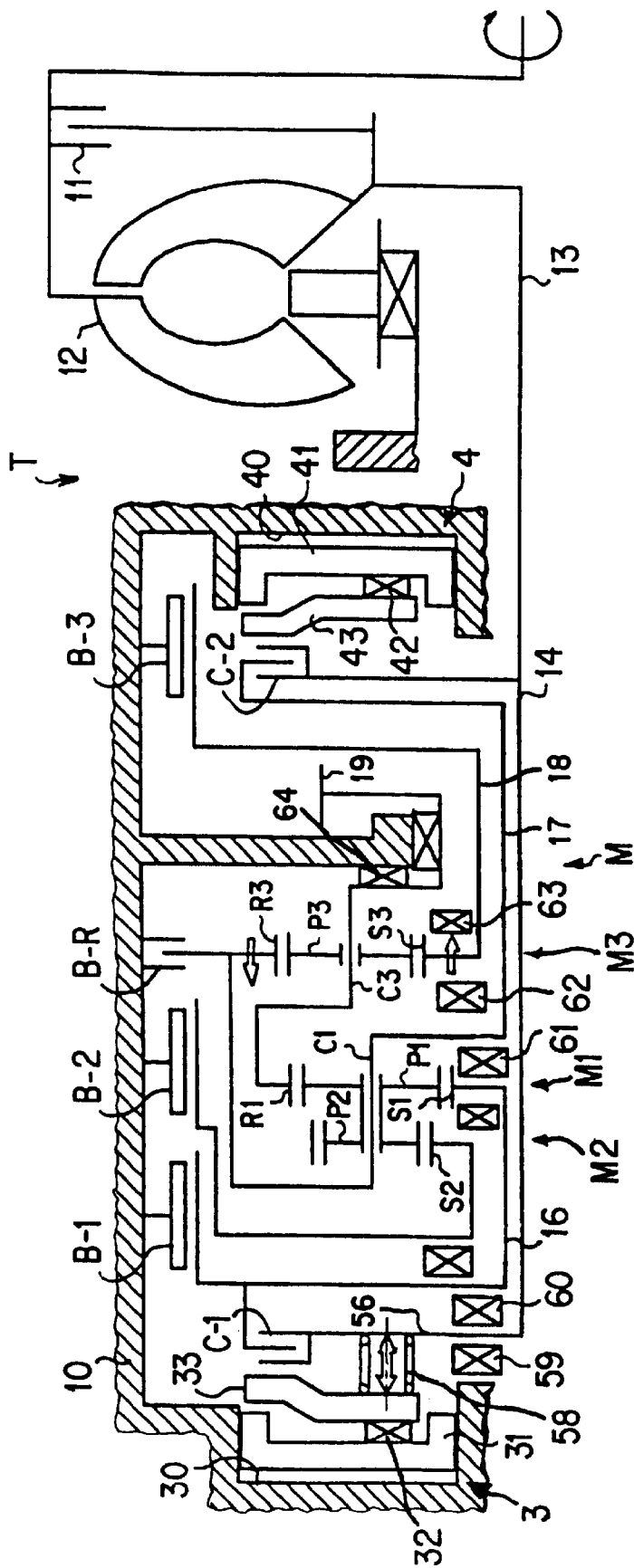
FIG. 1 is a schematic diagram showing the structure of an automatic transmission according to an embodiment, to which is applied a hydraulic servo unit of a vehicular power transmission system of the invention.

In FIG. 1, showing only the portion of the transmission T in addition to the structure for the axial support, the hydraulic servo 3 comprises a cylinder 30; a piston 31 fitted in the cylinder 30; a push member 33 abutting against the piston 31 through a bearing 32 for transmitting the push force of the piston 31 to the clutch C-1; and a return spring 58 of the piston 31. The input shaft 14 is equipped with a reaction member 56 opposed to the push member 33 for transmitting the push force of the piston 31 to the case 10, and the cylinder 30 is exemplified by a stationary cylinder formed in the case 10.

According to the invention, the return spring 58 is arranged between the push member 33 and the reaction member 56 and is set with a load for applying a load, higher than the thrust force acting upon the reaction member 56, to the push member 33 and the reaction member 56. In this mode, moreover, the helical tooth of the helical gear R3 is twisted in such a direction that the thrust force to act upon the reaction member 56 is, at a coasting time, in an opposite direction to the load of the return spring 58 and, at a driving time, in the same direction as the load of the return spring 58.

Reference numeral 4 in FIG. 1 designates a hydraulic servo having a structure similar to that of the hydraulic servo 3. The hydraulic servo 4 is likewise composed of a cylinder 40, a piston 41, a bearing 42 and a push member 43. On the other hand, numerals 59 to 64 designate individual thrust bearings.

Figure 4:
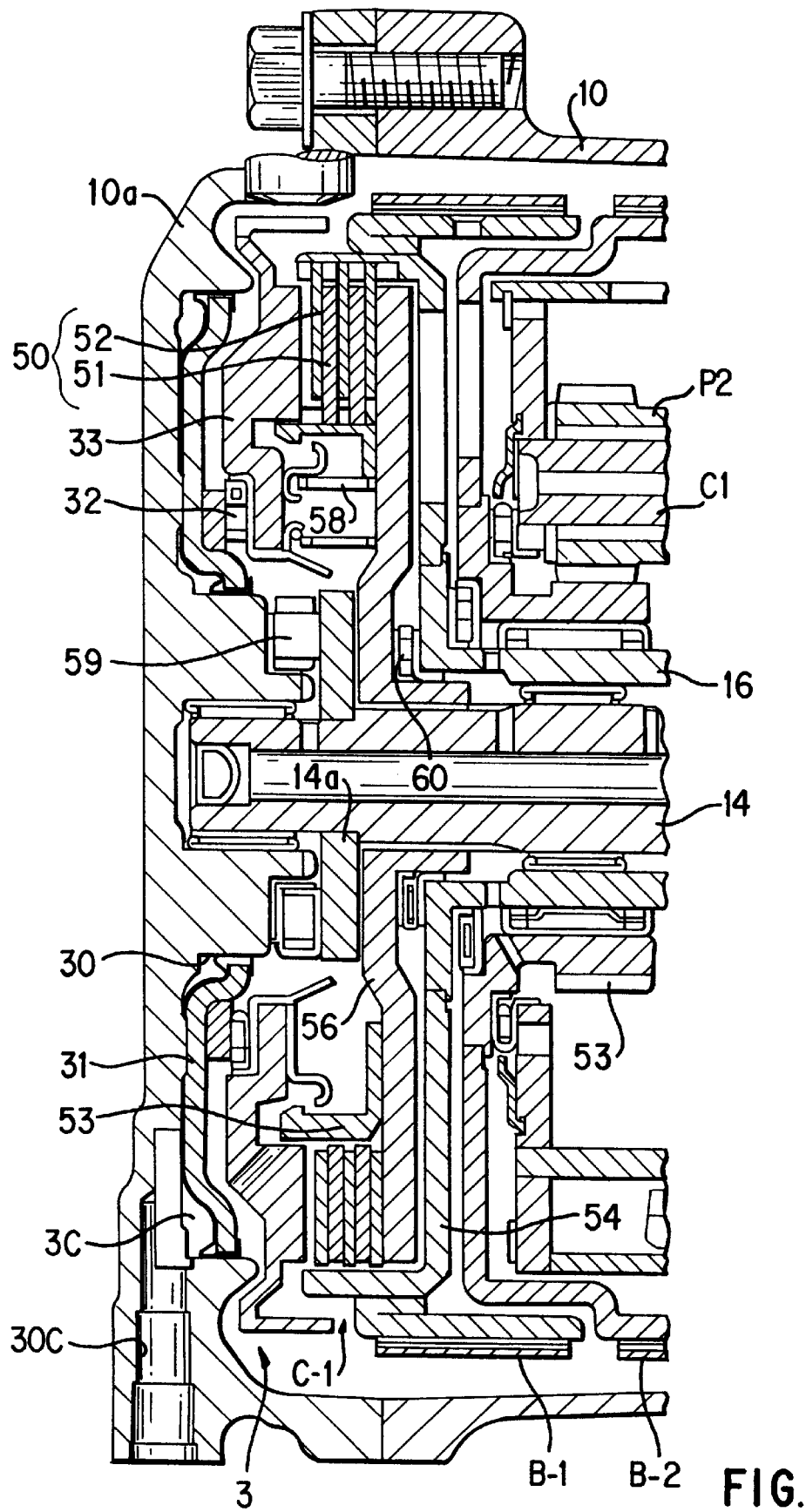
FIG. 4 is a cross section showing a portion of the clutch and the hydraulic servo of the embodiment.

FIG. 4 is a detailed section showing the hydraulic servo unit and its associated portion. The clutch C-1 comprises a hub 53 fixed on the reaction member 56 splined in the input shaft 14; a drum 54 fixed on the end flange of the sun gear shaft 16 and is equipped on its outer circumference with the band drum of the brake B-1; and a frictional plate portion 50 having a plurality of separator plates 51 splined at their inner circumferences in the outer circumference of the hub 53, and a plurality of friction members 52 splined at their outer circumference in the inner circumference of the drum 54, arranged axially alternately of the separator plates 51 and having facings on their two surfaces.

The hydraulic servo 3 comprises, as has been described hereinbefore, the cylinder 30 or the annular recess which is formed in the case 10, i.e., a cover 10a fastened on the case 10 by bolts; an annular disc-shaped piston 31 fitted slidably in the cylinder 30; the thrust bearing 32 arranged to abut against the end face of the piston 31 closer to the inner circumference; the annular disc-shaped push member 33 arranged between the clutch C-1 and the bearing 32 and confronting the bearing 32 at its inner circumferential side and the frictional plate portion 50 of the clutch C-1 at its outer circumferential portion; and the return spring 58 abutting against the end face of the push member 33 closer to the inner circumference at its one end through the spring seat and against the reaction member 56 at its other end and having a predetermined spring load. The push member 33 is provided at its one radially outer side with an abutment portion for the frictional members 52. The inner circumference of the abutment portion is splined like the separator plate 51 in the hub 53 connected to the input shaft 14, through the reaction member 56, and can not rotate relatively but can slide axially, and the outer circumference of the abutment portion is so axially extended as to cover the radially outer side of the drum 54 of the clutch C-1, to provide a rotor portion having a detecting slit for a clutch rotation sensor.

The end portion of the input shaft 14 is supported in a support hole, or recess, in the cover 10a by a radial bearing. In order that the leftward thrust force when applied to the input shaft 14 may not act upon the reaction member 56, the reaction member 56 and the input shaft 14 are splined axially slidably. The flange 14a, as fitted on the step portion of the input shaft 14, abuts against the cover 10a through the thrust bearing 59. The remaining associated portions will not be described as they are designated by the reference numerals of the corresponding portions of FIGS. 1 and 2.

Thus, in the hydraulic servo unit, the piston 31 is moved in the direction to apply the clutch C-1, when the oil pressure is fed from a supply oil passage 30c in the cover 10a to an oil chamber 3C of the hydraulic servo 3. Then, the bearing 32 and the push member 33 are accordingly moved to push the frictional plate portion 50 between the reaction member 56 for taking the reaction on the case 10 and the push member 33 thereby to apply the clutch C-1. Since the bearing 32 and the push member 33 are interposed between the piston 31 and the clutch C-1, the push force from the piston 31 can then be transmitted to the frictional plate portion 50 while allowing a relative rotation between the clutch C-1 and the piston 31.

The reason the thrust force is transmitted to the reaction member 56 by the power transmission of the ring gear R3 made of the helical gear will be described with reference to FIG. 1. In the automatic transmission T, as previously described, the clutch C-1 is applied while the vehicle is being driven, at the upshift from the second speed ($2^{ND}$) range to the third speed ($3^{RD}$) range, at the downshift from the fourth speed ($4^{TH}$) range to the third speed ($3^{RD}$) range, and at the downshift from the second speed ($2^{ND}$) range to the first speed ($1^{ST}$) range. At the second speed ($2^{ND}$) range and the fourth speed ($4^{TH}$) range before those shifts, the carrier C1 is connected to the input shaft 14 by the application of the clutch C-2 so that the ring gear R3 participates as an input element in the power transmission.

At the driving time, therefore, the thrust force of the ring gear R3, acting in the opposite direction to that indicated by a blank arrow of FIG. 1, is transmitted through the carrier C1 and the bearing 62 to the sun gear S3 until it balances with the opposite thrust force being generated in the sun gear S3. As a result, the reaction member 56 is pushed rightward of the drawing by the set load of the return spring 58, and this thrust force is transmitted through the bearing 60, the sun gear shaft 16, the bearing 61, the flange of the carrier C1, the bearing 62, the sun gear S3, the bearing 63, the flange of the carrier C3 and the bearing 64 to the case 10 so that they are placed in predetermined axially close positions. On the other hand, the push member 33 is pushed leftward by its reaction to push back the piston 31 to a predetermined position through the bearing 32 thereby to hold the piston 31 in the position. Thus, the clearance between the hydraulic servo 3 and the clutch C-1 is held at the predetermined value.

At the coasting time, on the other hand, the thrust force of the ring gear R3 acts in the direction indicated by the blank arrow in FIG. 1, and is transmitted from the flange of the carrier C1 through the bearing 61 to the sun gear shaft 16 and further through the bearing 60 to the reaction member 56. This force acts to displace the reaction member 56 leftward of the drawing. By the aforementioned load setting of the return spring 58 according to the invention, however, a load exceeding the thrust force acts upon the reaction member 56 so that the reaction member 56 is placed in the predetermined axially close position by the transmission of a force similar to that of the driving time. Moreover, the push member 33 also pushes back the piston 31 to the predetermined position. Thus, the clearance between the hydraulic servo 3 and the clutch C-1 is held at a value similar to that of the driving time.

Incidentally, the passage for transmitting the push force, as acting upon the reaction member 56 after the clutch application, to the case 10 will not be described because it is similar to that for transmitting the set load of the return spring 58 at the driving time to the case 10.

In short, according to the hydraulic servo unit of the embodiment, the return spring 58 is arranged between the reaction member 56 and the push member 33 so that it acts to retain the clearance of the push member 33 from the clutch C-1. Moreover, the load of the return spring 58 is higher than the thrust force of the helical gear R3 acting upon the reaction member 56 to act upon the reaction member 56 and the push member 33. Irrespective of the change in the thrust force acting upon the reaction member 56, therefore, the push member 33 is pushed back to a close state, through the individual intermediate members, from the case 10 so that the clearance between the clutch C-1 and the push member 33 of the hydraulic servo 3 is held constant at all times. As a result, the piston stroke to the engagement, as effected by supplying the oil pressure, is stabilized to prevent the reduction in the controllability of the clutch C-1.

As compared with the driving time, moreover, the thrust force is relatively low at the coasting time (usually some tenths of that at the driving time). By causing the lower thrust force at the coasting time to act against the push force, therefore, the spring load necessary for the return spring 58 can be set to a lower value than by causing the thrust force at the driving time to oppose the push force. As a result, the oil pressure necessary for applying the clutch C-1 can be lowered.

Although the invention has been described as applied to the specific automatic transmission, it should not be limited to the aforementioned embodiment but can be applied to various power transmission systems. Thus, the invention can be applied to a wide variety of vehicular power transmission systems by modifying the specific structure within the scope of the definition of claims.

What is claimed is:

1. A hydraulic servo unit, in a vehicular power transmission system having a helical gear which produces an axial thrust force upon rotation, comprising:

a clutch for connecting predetermined rotary elements to each other; and a hydraulic servo for applying the clutch, the hydraulic servo comprising:
     a cylinder;
     a piston fitted in the cylinder;
     a push member abutting against the piston through a bearing for transmitting the push force of the piston to the clutch; and
   a return spring for the piston, wherein one of the rotary elements includes a reaction member which receives the axial thrust force of the helical gear and is opposed to the push member for transmitting the push force of the piston to a case, and the cylinder is a stationary cylinder formed in the case, wherein the return spring is arranged between the push member and the reaction member and loaded to apply a load higher than the axial thrust force of the helical gear, as acting upon the reaction member, the thrust force of the helical gear acting upon the reaction member is at a coasting time in the opposite direction to the load applied by the return spring and at a driving time in the same direction as that of the load applied by the return spring.

\* \* \* \* \*